United States Patent [19]

Kaye

[11] 4,091,187

[45] May 23, 1978

[54] BATTERY CARTRIDGE

[75] Inventor: Gordon E. Kaye, Garrison, N.Y.

[73] Assignee: P.R. Mallory & Co. Inc., Indianapolis, Ind.

[21] Appl. No.: 793,004

[22] Filed: May 2, 1977

Related U.S. Application Data

[63] Continuation of Ser. No. 425,055, Dec. 14, 1973, abandoned.

[51] Int. Cl.² .............................................. H01M 6/42
[52] U.S. Cl. .................................... 429/159; 429/211; 429/100
[58] Field of Search .................. 429/159, 211, 98, 100, 429/163

[56] References Cited

U.S. PATENT DOCUMENTS

| 2,692,944 | 10/1954 | Mendelson | 429/163 X |
|---|---|---|---|
| 3,181,974 | 5/1965 | Barbera | 429/100 |
| 3,575,725 | 3/1969 | Kaye | 429/157 |
| 3,660,169 | 5/1972 | Clune et al. | 429/159 |
| 3,742,832 | 7/1973 | Stoneham et al. | 429/98 X |
| 3,794,525 | 4/1972 | Kaye | 429/9 |

Primary Examiner—Charles F. LeFevour
Attorney, Agent, or Firm—Ronald S. Cornell; Israel Nissenbaum; Charles W. Hoffmann

[57] ABSTRACT

A battery cartridge having a hollow case of minimum thickness, weight and dimensions, with minimum excess over the minimum weight and volume dimensions of the contained battery cells; with simple arrangement for assembling battery terminals that are extendable to a space outside of the case to permit easy welding operation, and are then foldable back into the case to be completely covered and disposed within the case, when the case is closed and sealed to protect the battery cells. Open spaces in a wall of the cover of the case, provide windows for access to the terminals of the battery cells, for engagement by pressure contacts external of the case and connected to an external circuit to which the battery energy is to be supplied.

11 Claims, 8 Drawing Figures

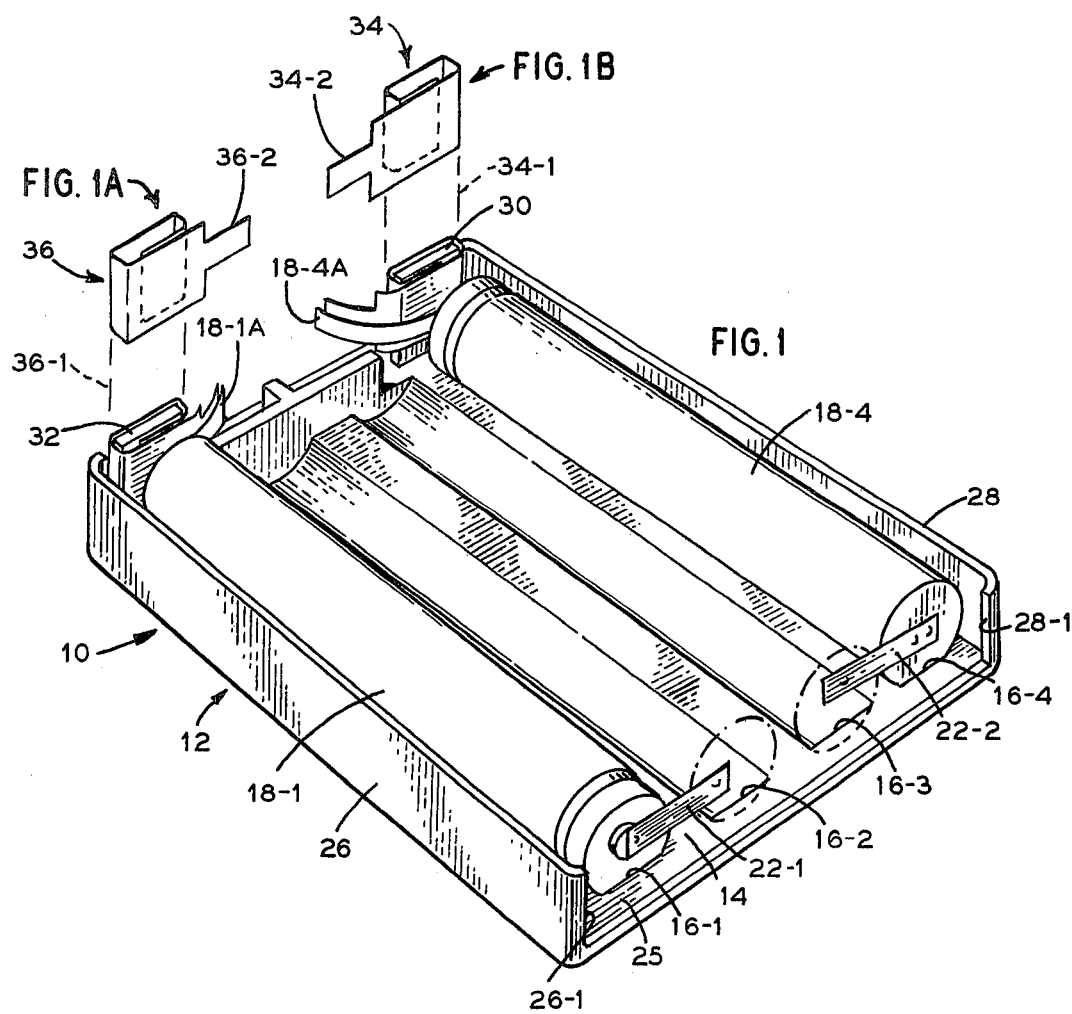
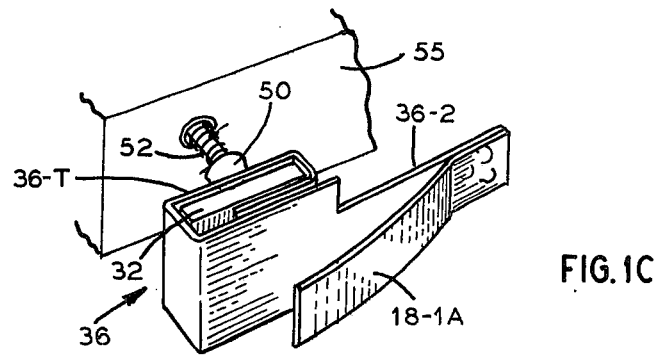

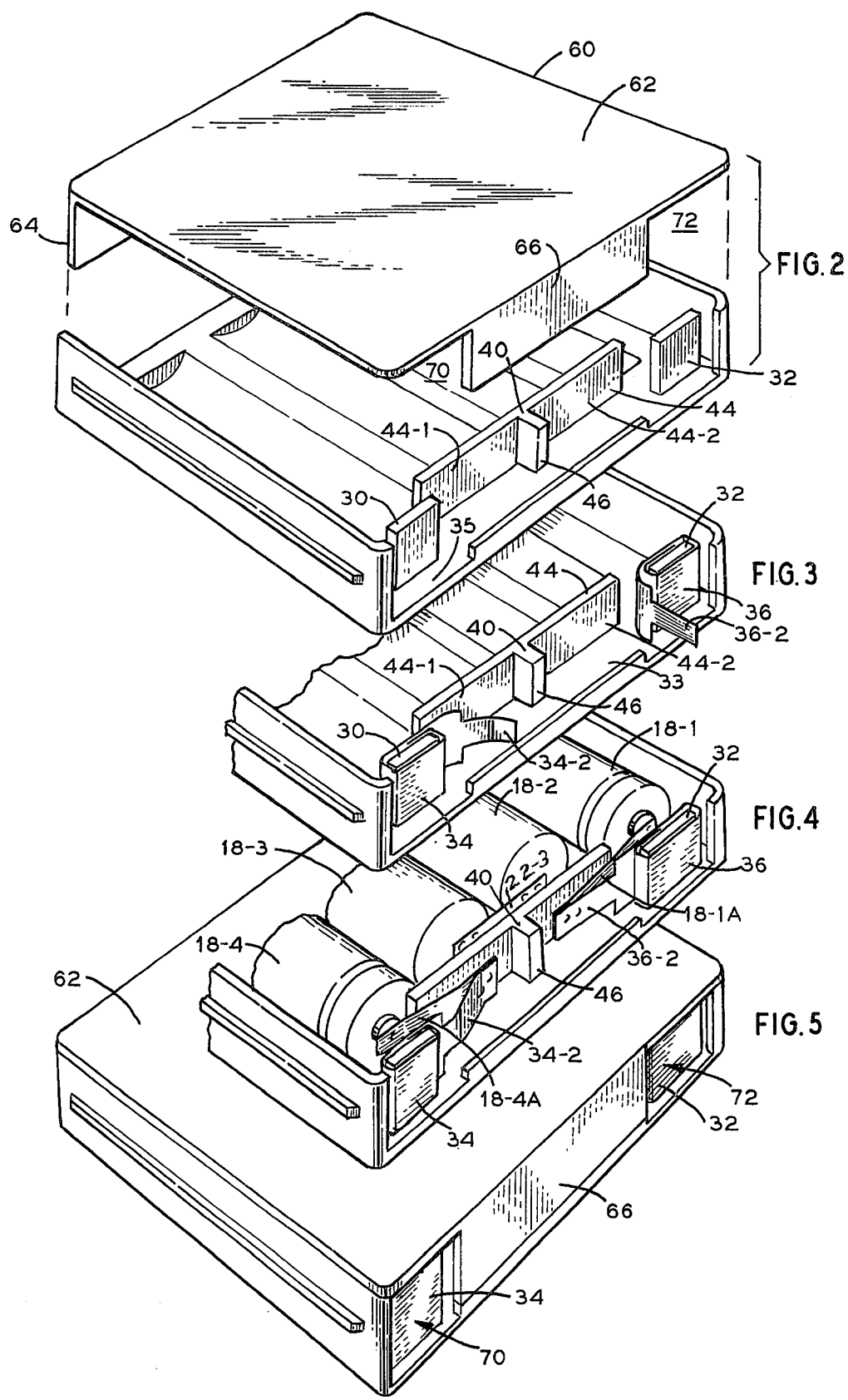

BATTERY CARTRIDGE

This is a continuation of application Ser. No. 425,055, filed Dec. 14, 1973 now abandoned.

DESCRIPTION OF THE INVENTION IN A PREFERRED MODIFICATION

This invention relates to battery packages, and particularly to battery cartridges, constructed to permit direct simple insertion into operating position in a small device requiring electrical energization, such as a camera, small portable radio, small pocket computer, and the like.

In small portable electrical operating devices, such as radios, cameras, and computers, weight and volumetric space requirements are important, and must be kept to a minimum. Since batteries are essential for the operation of the device, the dimensions of the battery cells, in the aggregate, become the minimal limits in the dimensions of the cartridge, and, similarly, the weight of those cells becomes the limit sought for in the minimum weight to which the cartridges can be reduced, and produced in a suitable design. Therefore, in order to reduce the dimensions and the weight for the battery package for such portable devices, an accommodating plastic cartridge case for the battery should be made to have a minimum of volumetric space, and, consequently, it will also correspondingly have a minimum of weight.

An important feature, in connection with the application of batteries to such small portable devices, is the ease of insertion or application of the battery into the structure of the device, for connection to the built-in electric circuitry that is involved in the operation of the device.

The primary object of this invention is to provide an electric battery for such applications, assembled in a cartridge case form, and made available for insertion in the device as a cartridge.

Another object of the invention is to make a cartridge-type battery, in which a cartridge case which contains the battery cells will be of minimum weight and of minimum volumetric dimension in excess of the minimum in volumetric space and weight of the battery cells themselves.

Another object of the invention is to make the cartridge case inexpensive to manufacture, so the entire cartridge may be discarded when the battery cells have given up all their available energy.

Another object of the invention is to provide a cartridge-type battery, with a case that will be formed to embody a pilot element, that will require the cartridge to be inserted in a predetermined mode with respect to its receiving case, so that the battery will be properly applied to the receiving circuit according to the polarity disposition of the system.

Another object of the invention is to provide a cartridge case that will be so small in dimension and so light in weight over and above the dimensions and weight of the battery cells, that the case itself will add very little to the space requirements and to the weight of the cells, when the cartridge is inserted into the electrical device in which the battery is to provide energy.

Another object of the invention is to provide a cartridge-type battery, of several cells according to the voltage of the circuit to be served, in a simple cartridge case, which will be easily and readily insertable into a space or cavity provided for the purpose of receiving the cartridge case, for which the space dimensions of the cavity will be predesigned to permit simple and easy insertion of the cartridge, and require insertion in a definite mode, into operating position in the device to be served.

This application is an extension of and an improvement upon my copending application Ser. No. 394,031, filed Sept. 4, 1973 now U.S. Pat. No. 3,887,394 said patent having been reissued on Aug. 31, 1976 as U.S. reissue Pat. No. 28,948 based upon reissue application Ser. No. 635,826 which was filed on Nov. 28, 1975.

An important object of the present invention is to provide a battery terminal assembly, in which pressure stresses will be minimized that are impressed upon the terminals of the batteries, and that could be possibly transmitted through those cell terminals to the bonding areas where the terminals are connected to the cell surfaces, and detrimentally affect the bond.

Another object of the invention is to provide an improved design and construction, that will enable the battery terminals to be assembled and connected to the battery cells in a simple manner, after the cells are appropriately assembled in the case during manufacture.

Another object of the invention is to provide an improved design and method of assembly, that will permit appropriate electrical connections to be made between cells and battery terminals assembled in place on the case and within the case, whereby battery terminals may be temporarily extended outside of the case for easier manipulation and welding operation to cell terminals bonded to the electric cells, to permit ease of operation during manufacture; after which the welded connections may be moved back into a region that will entirely be within the case when the case is closed and sealed.

In order to reduce the weight of the cartridge case the walls of the case should be made as thin as possible. With the walls made as thin as may be possible for this purpose, there is a problem in establishing necessary free flow of the fluid plastic in the forming mold, in a long linear path within correspondingly narrow spaces in the forming mold.

In my previously filed co-pending application, I have disclosed a structural design for the battery case, that permits the case walls to be made extremely thin, with suitable and adequate reinforcing design structure, and that serves also, during the forming operation in the mold, to permit free flow of the fluid plastic in the mold to reach the areas necessary for the formation of the walls of the battery case. Those same design features in the battery case structure are utilized in the battery case of the present application. In the battery case of this application, however, some parts of the case have been shaped differently to provide still further reduction in the volume of the material required in the case body, thereby reducing the weight still further, while at the same time retaining adequate structure to maintain the strength of the battery case and so provide the necessary protection for the cells of the battery contained within the case.

Generally the battery case is formed in plastic, and embodies a bottom tray with suitable parallel longitudinal flutes to serve as beds for a plurality of elongated electric cells that are to make up the battery. When the cells are to be connected in series circuit relationship, the cells are alternately inverted, to enable direct electrical connections to be made by simple tabs connected between appropriate central axial areas of two adjacent cells.

One feature of the present invention is a structure and arrangement and manner of connection of battery polarity terminals to the two end cells of the battery. Another feature is an appropriate design structure of the bottom tray of the case where supporting posts are provided to serve as mounting posts for the polar terminals of the battery. These posts serve also as positioning elements for these terminals, and as reaction pressure elements for bracing and backing these terminals when pressure is applied to those terminals from an external circuit contact element for contacting the battery into an external circuit to supply energy thereto.

A plastic cover for the plastic bottom tray serves to hold the cells in place in their seating grooves, and, when finally assembled, the cover and the bottom of the tray are joined and sealed with supersonic energy applied along the outer edges of the tray and on the cover.

The cover is formed to define a couple of cut-outs or open spaces, which, in the final assembly, will serve as windows adjacent the posts on which the battery terminals are supported, so that access may be had through those windows to the terminals by the external pressure contacts of the external circuit.

The bottom tray is generally open along one end where the posts are located, so that an extending tab on a terminal supported on the post may be positioned to engage a corresponding tab connected to the adjacent cell. The two tabs are long enough to be bent to extend into the space outside of the case contour, where they are then readily accessible, and can be worked on to perform a welding operation to join the two tabs. After that welding operation is performed, the tabs are then easily folded back into a space within the bottom tray; and the subsequent positioning of the cover on the tray closes the case and holds the terminal tabs within the closed case, while at the same time permitting access through the two windows, previously mentioned, for engagement of each terminal on a post.

Two posts are provided, one for each polarity of the cell, and their locations will correspond to the pre-fixed positions of two pressure terminals within the device into which the battery pack is to be inserted for service. In order to insure that the battery pack is inserted in proper direction for proper polarity, one side wall of the battery case is provided with a pilot guide rail to fit into and slide in an appropriately located guide channel suitably mounted in the device to which the battery is to be applied.

The design and construction of the battery case and the manner in which the cells are assembled in it, together with the terminals, are shown in more detail in the drawings:

FIG. 1 is a downward perspective view of the bottom tray, in which four cells are to be accommodated and assembled for the battery;

FIGS. 1-A and 1-B are perspective views of wrap-around helical terminals, to serve as terminals for the battery in assembly, with extension tabs shown for connection to corresponding tabs on the terminal cells of the battery;

FIG. 1-C is a perspective view showing the manner in which the tab of the wrap-around battery terminal is welded to a tab leading to one of the cells;

FIG. 2 is an exploded perspective view showing the bottom tray and the cover for the battery case of this invention;

FIG. 3 is a perspective downward view of the upper end of the tray of the battery case of this invention, illustrating the manner in which the tabs of the respective terminals may be turned outward, beyond the tray, into working space outside of the tray, to permit the welding operation to the tabs of the cells in free open space;

FIG. 4 is a perspective view, similar to that of FIG. 3, showing how the terminal tabs, after being welded to the cell tabs, are moved back into protective position against an insulating wall, between the tabs and the cells, so all of the metal of the metal tabs of the terminal will be within battery case when the case is ultimately closed;

FIG. 5 is a perspective view of the corresponding working end of the battery case, showing the cover in place over the tray, with the open corners of the end wall of the cover, as visible in FIG. 2, serving as windows to provide access to the terminals supported on the posts on the bottom tray, as visible in FIG. 3; with the guide rail also indicated on the side wall of the bottom tray of the case to serve as a polarizing key in assembling the battery pack, in the device to be energized.

As shown in the drawings, the invention generally consists of a bottom tray provided with four longitudinal flutes in this structure, to accommodate four elongated cells to be connected in series circuit relationship to constitute a four-cell battery. The two battery terminals are to be disposed at one end of the bottom tray, and to be accessible from outside the battery case, after a top cover is placed in position over the bottom tray to seal the tray as a closed box with the cells held in position.

The design and construction are such that all of the terminals will be within the box when finished sealed and closed, with access permitted to the two terminals of the battery through two open spaces that serve as windows for the battery case, through which windows two external contact elements may project into the box to engage the stationary terminals of the battery, when the battery case is inserted into a device which it is to provide with battery energy.

As shown in FIG. 1, battery package 10, of this invention, comprises a bottom tray 12 having on its bottom, or floor surface 14, four parallel longitudinal flutes 16 - 1, 16 - 2, 16 - 3 and 16 - 4, to accommodate four elongated electric battery cells 18 - 1 through 18 - 4, of which only 18 - 1 and 18 - 4 are shown in position, in FIG. 1.

In order to permit the cells to be connected in proper series circuit relation, the cells are arranged in alternate polarity relationship, so they may be connected in series, at each end, by a simple conducting strip indicated as 22 - 1, and 22 - 2 at the bottom end of the tray, and as 22 - 3 at the upper or front end of the tray; thus tab 22 - 1 connects cells 18 -1 and 18 - 2 in the final assembly, and 22 - 2 connects cells 18 - 3 and 18 - 4 in the final assembly. Tab 22 - 3 connects cells 18 - 2 and 18 - 3 in the final assembly.

It will be understood of course that a suitable layer of insulating material is under each of the connecting tabs 22 - 1, 22 - 2 and 22 - 3, in order to prevent short-circuiting of the two adjacent cell that are connected by those tabs.

In my prior patent application, referred to above, Ser. No. 394,031, filed Sept. 4, 1973, there is explained the construction of the bottom part of the case, corresponding to the tray 12, here, and the manner in which its formation is controlled in the mold to permit the case, or the tray in the present instance, to be made of minimum thickness, for achievement of minimum weight. In the present instance, the tray 12 is further reduced in weight by forming the tray without the bottom end wall, as in FIG. 1, in order to leave a free space 25 between the two side edges 26 - 1 and 28 - 1 at the end edge 5 of the two side walls 26 and 28. This free space 25 will be covered by a depending apron on the top cover, later to be identified and shown in FIGS. 2 and 5.

An important feature of this invention is shown at the upper or forward end of the tray 12, as shown in FIG. 1, and as further illustrated in some detail in FIGS. 2 and 3 and 4.

For the purpose of that feature of the invention, the bottom tray 12 is constructed to embody two integral posts 30 and 32, that rise from the floor 33 of the bottom tray 12, and stand erect adjacent the upper or forward end edge 35 of the bottom tray, and are substantially parallel to, and spaced back slightly from, the plane of the forward end edge 35 of the bottom tray. Those two posts are to accommodate two battery terminals 34 and 36, that will be slipped in place over those two posts 30 and 32, as indicated in FIG. 1. This construction is further shown in FIGS. 3 and 4. To separate and insulate the terminals on posts 30 and 32, an insulating wall and barrier 40 is disposed slightly behind the plane of the two vertical posts 30 and 32, that barrier also is formed to stand erect from the floor 33 of the bottom tray 12. That barrier 40 is provided with a forwardly projecting wall or partition 46, to serve as an insulating spacer between the two parts of the rear barrier wall 44, identified as 44 - 1 and 44 - 2. Their function together with the partition 46, is to provide two insulated and separated spaces for receiving the two terminals of the battery, as will be presently described.

One of the problems encountered in assemblages of small cells in multi-cell batteries, is the loosening of a metallic tab connected to a surface or terminal of a cell, where a stress remains in the welded connection of the tab, and the cell, in its functional environment during operation, is subjected to shock or vibration that causes the welding connection of the tab to the cell surfaces to be weakened and loosened. One of the conditions that contributes to this undesirable effect of loosening a tab on the cell, to which it has apparently been welded solidly, is the disposition of the cell in such manner that a terminal connected to the cell, or welded to the cell surface, is subjected to a continuous external stress. Such continuous stress may be due to the disposition of the cell, in its environment, so that any vibration on the cell aggravates the tension condition in the tab where it is welded to the cell. The tension may be such that even the welded connection finally gives way and separates, but usually because the weld itself may not have been as good as it seemed.

The need to eliminate such tension condition is all the more important in connection with small cells, because in the case of a small cell, the welding operation must be limited both as to time and the amount of energy introduced into the weld. Where such operation is performed manually, the operation requires considerable skill, and, even with that skill, a slight variation in the welding time or heat applied may produce a weaker weld, that will give way in time, to vibration that aggravates any stress remaining in the tab welded to the cell surface.

In order to avoid the condition that impresses and maintains a tension condition on the tab that is welded to an electric cell, especially a small cell that is disposed in a battery case used for small portable devices, such as previously mentioned, namely, small portable radios and small portable computers, now available on the market, a primary purpose of this invention is to provide a new type of terminal connection, in which no residual stress is left in the small tab that is connected to the cell, and that might respond to the vibration, and otherwise affect the continuity of the connection of the tab to the cell.

One of the other conditions that has greatly contributed to the problem of maintaining the connection of a terminal tab to an electric cell, has been the disposition of the cell tab in such manner that the tab served also as a pressure-receiving terminal surface for the cell, to be engaged by an external contact for connecting the cell or the battery to an external circuit. In that case, the pressure of the external contact on the cell tab created a stress condition on the weld between the tab and the cell, that in some cases could be substantial, depending upon the manner and direction in which the weld between the tab and the cell was randomly disposed. Thus, the weld between the tab and the cell could create a stress line between the two welded surfaces, and subsequent pressure of an external contact on the tab culd emphasize and amplify that stress line condition, so that any subsequent vibration might ultimately accumulate to a degree that could loosen the weld, depending upon how strong the weld had been in the beginning.

As previously indicated, one of the objects of this invention is to provide a new type of terminal connection to a terminal cell of a battery, so that the terminal condition, or element used to serve as a terminal for the battery, will be disposed to be subject to the compression force of an external contact, and will be able to resist the pressure force of the external contact, and will absorb that pressure without in any way transmitting the applied pressure force, that will otherwise serve to increase the tension of any connection to the cell.

In order to avoid impressing such external pressure force on any part of the cell connection between the cell and the tab, a separate terminal, with a tab is provided, and the tab is resiliently connected between the pressure-receiving element of the terminal and the cell. In that manner, the present construction provides for a pressure-receiving element that will not transmit any part of that pressure force to the tab, but instead will absorb that pressure force completely in itself, as braced against a suitable pressure-reaction element in the battery case.

That bracing action is the function of the two posts 30 and 32, that serve as pressure-resisting and back-up elements for the two terminals 34 and 36.

The two terminals 34 and 36 are shown in FIG. 1, separated from their normal position as indicated by the adjoining broken lines 34 - 1 and 36 - 1, to show the paths in which those two terminals 34 and 36 are moved onto their respective posts 30 and 32. In FIG. 1, the two terminals 34 and 36 are also shown in place, on their respective posts 30 and 32. Similarly, in FIG. 3 terminals 34 and 36 are shown already placed and mounted on their respective posts 30 and 32. The two terminals 34 and 36 are shown provided with a tab, respectively 34 - 2 and 36 - 2. The main body of each terminal 34 and 36 is formed as a helix loop of copper or similar conducting material, with a 1¼ turn sufficient to encircle and seat on a respective post 30 and 32, and to remain in position on those respective posts, due to the inherent holding action of the loop formed by each of the terminals 34 and 36.

Each of the two end cells 18 - 1 and 18 - 4 will be provided with an individual cell tab 18 - 1A and 18 - 4A. The cell tab 18 - 1A and the adjacent terminal tab 36 - 2 are then welded together at their outer end, and is more clearly shown in FIG. 1C.

As further shown in FIG. 1C, outer surface 36 - T serves as the pressure-receiving surface, as a terminal for the battery and receives the pressure of an external pressure contact 50, that is normally forwardly spring-biased by a spring 52 to put pressure on the front end of the pressure contact 50 for engaging the battery terminal surface 36 - T with sufficient pressure to establish a good electrical contact.

The schematic showing in FIG. 1C illustrates how the battery terminal 36 is supported on the post 30 or 32. The tab 36 - 2 is on the backside of the post 32, and does not receive the pressure from the external circuit pressure contact 50, through which energy from the battery is supplied to the device being served. The pressure from the pressure spring 52 is continuously on the contact element 50, and maintains good pressure contact with the terminal surface 36 - T, but none of that applied pressure is transmitted in any harmful way around the terminal 36 to the back part of the terminal where the tab 36 - 2 is welded to the cell tab 18 - 1A. Thus, with this construction, none of the pressure from the external contact is transmitted to the cell tab, that would otherwise impress a shearing force due to vibration on the weld between the cell tab and the cell surface, if the cell tab were to serve as the terminal to receive the pressure directly from the external contact, as in conventional structures.

As schematically shown in the structure of FIG. 1, and in the arrangement shown in FIG. 3, the two tab portions, 36 - 2 and 18 - 1A, from the terminal 36 for the battery, and the other connected to the cell, 1B - 1, as shown in FIG. 1C, are given sufficient length to permit them to be extended out into the space beyond the end plane of the case, so that the welding operation shown in FIG. 1C can be performed with relative ease by a conventional welding tool that straddles and presses the two tabs together.

After the two tabs are thus welded, as shown in FIG. 1C, they are then moved back into the space within the bottom tray against the two barrier surfaces 44 - 1 and 44 - 2, as shown in FIG. 3, so that all of the metal of the terminal elements, including the tabs, will be within the limits of the bottom tray when the tray is covered and the box closed.

After the welded terminal elements and tabs are moved back against the barrier structure 44, the two tab structures will be insulated from each other by the separator 46. The cover 60 is then applied to the top of the tray, and is suitably bonded to the tray to close the case. One suitable bonding procedure, employed in this case, has been the use of supersonic energy along the meeting edges of the bottom tray and the cover.

As shown in FIGS. 2 and 5, cover 60 is provided with a top layer 62, a full length end wall 64, to cover the bottom of the tray shown in FIG. 1, and an end wall 66 to fit down over the front end of the tray, over a sufficient dimension to cover the two tab assemblies that rest against the barrier 44, with the two corners parts of the cover not provided with any end wall, so that there will be left two windows or open spaces 70 and 72, directly in front of the two terminals 34 and 36 that serve as the terminals on the battery. Thus, an external contact corresponding to the pressure rod or contact 50, shown in FIG. 1C, fixedly mounted in the device 55 which is to be served by the battery, will extend through one of the windows 70 or 72, and engage the contact surface, for example 36 - T, as shown in FIG. 1C, to establish electrical contact for the external circuit of the device 55 that is to be served by the battery.

Thus, by the construction of the battery package herein shown, the volume of the case is reduced to a minimum, while still adequate to serve the purpose of supporting and confining the cells. Thus the weight of the package is reduced to a minimum.

Also, the construction of the terminals is made such as to prevent the imposition of stresses on the tab-to-cell connection, and thus assures longer life and operation of the cell circuitry for the battery, through the associated terminal tabs.

Further, the provision of the back-up reaction-pressure surface by means of the supporting posts 30 and 32 for the terminals 34 and 36 provides a highly effective form of terminal construction to receive pressure from an external pressure element, with the pressure forces directed and limited to the specific area in front of the post, which the post can adequately absorb, and which serves to prevent stresses from an external pressure forces from being transmitted to the tab connection to the cell.

As previously pointed out, the relatively small sizes of the cells of the battery provide very little surface for the welding of the tab to the cell, both because the welding area of the small cell is in itself a minimum, but, even more important, because welding heat must be kept to a minimum to avoid affecting the internal chemical elements of the cell, and from affecting the construction in the cell. Thus, the construction of the terminal which removes stresses from the tab connection to the cell is a highly important feature of this invention.

It will be understood that modifications might be made in the case structure, and in the disposition of the terminals, without departing from the spirit and scope of the invention as set forth in the claims.

What is claimed is:

1. A disposable, sealed, removable battery cartridge, comprising a case of insulating plastic material to accommodate and to enclose a battery having a plurality of cells; said case including a bottom tray for receiving and supporting the cells, and a cover for closing said bottom tray; terminal means for said battery of cells including terminals having respective planar terminal expanses;

and openings serving as windows in the case and disposed in front of said terminal means respectively in coplanar relation with said terminal expanses for providing access to abuttingly engage said terminal expanses from outside said cartridge for electrically coupling the battery to an external circuit, said case embodying support means for isolating any pressure directed onto said terminal expanses from said cells, said cartridge further including electrically conductive means electrically connected to said terminal means and to polar surfaces of said cells to provide desired battery potentials at said terminal means.

2. A battery cartridge, as in claim 1, in which such electrical connections of said electrically conductive means to said terminal means and said polar surfaces are permanently bonded connections.

3. A battery cartridge, as in claim 1, in which said bottom tray has a substantially rectangular floor with full length side walls and no end walls; and said cover embodies an upper rectangular ceiling extending a full width over the area between the two side walls of the bottom tray, and further embodies two vertically depending end walls to cover selected areas at the two ends of the bottom tray, one of said end walls defining said windows.

4. A battery cartridge, as in claim 1, in which said bottom tray embodies integrally formed elements defining said support means and providing reaction bracing surfaces against which said terminal expanses are pressed by external contacts to establish an electrical circuit connection between the battery and an external circuit.

5. A battery cartridge, as in claim 4, in which the cover for said bottom tray embodies a cut-out portion defining said windows and disposed in front of said integrally formed elements, thereby to provide access for external contact elements to pass through said windows to engage said terminal expanses.

6. A battery cartridge, as in claim 5, in which said windows provide access to two said terminal means or respective opposite polarity; and wherein a side wall of the case is provided with integral guide means to require the case to be inserted in a predetermined mode in an external device in which the battery cartridge is to be used, whereby said terminal means will be connected to the external circuit in proper polarity relation.

7. A battery cartridge, as in claim 1, in which said bottom tray has two spaced posts integral therewith defining said support means and disposed at locations adjacent the ends of two of said cells, wherein said terminal means comprises a terminal having such terminal expanse and anchored on each said post; and wherein said electrically conductive means includes a strip member bonded to and electrically connected to each said terminal and to a polar surface of an adjacent cell.

8. A battery catridge, as in claim 7, in which each said post is non-circular in cross-section; and such terminals are shaped to fit for direct application to said posts and to be held substantially against relative movement with respect to said posts, each said terminal embodying a freely extending tab extension fixedly electrically connected to one said strip member.

9. A battery cartridge, as in claim 8, in which each said post is shaped to have a substantially flat front surface; and each said terminal is shaped to permit direct axial slip-on onto one of said posts, with such flattened shape of the assembled post and terminal serving to hold each terminal against relative angular movement on its post, each post serving as a reaction-pressure surface to brace its terminal against the applied pressure of an external contact element of an external circuit.

10. A battery cartridge, as in claim 1, wherein said support means comprises elements integrally formed with said case, wherein said terminal means includes terminals anchored on said integrally formed elements and wherein said electrically conductive means comprises metal strips.

11. A battery cartridge comprising:
(a) an elongate electrically insulative case defining an interior containing a plurality of cells interconnected to provide a potential difference between a pair of polar surfaces thereof, said case defining apertures for access by external contact members to said interior thereof, said case restraining said cells from movement along the longitudinal axis thereof;
(b) cartridge terminal means;
(c) support means formed integrally with said case for supporting said terminal means interiorly of said apertures in position to be abuttingly engaged by said external contact members on movement thereof interiorly of said case and for supporting said terminal means in spaced relation to said polar surfaces of said cells; and
(d) electrically conductive means electrically interconnecting said terminal means and said cell polar surfaces, whereby such connections of said electrically conductive means respectively with said terminal means and with said cell polar surfaces are isolated from forces applied to said terminal means by said external contact members on such abutting engagement thereof.

* * * * *